Feb. 20, 1923.
J. H. DEARHOLT
TWINE CUTTER
Filed Nov. 18, 1921
1,445,667
Fig. 1.  Fig. 2.  Fig. 3.
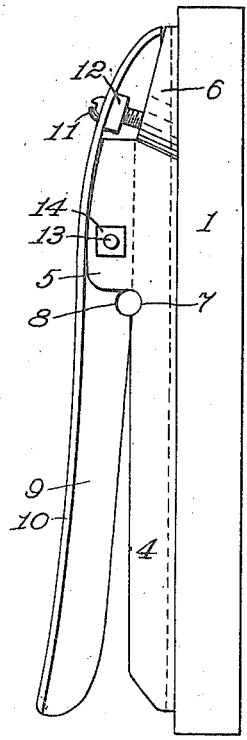
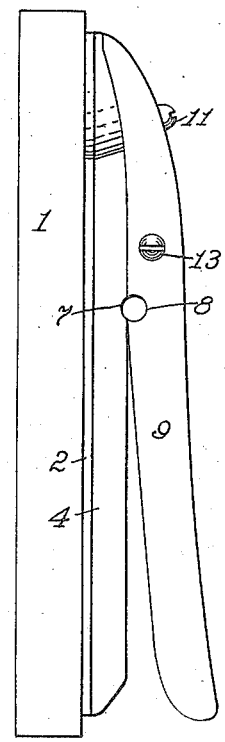
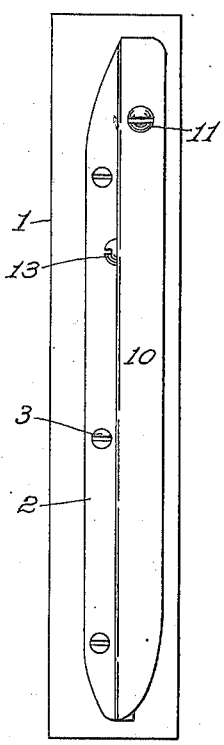
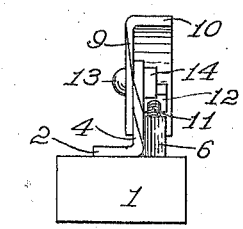
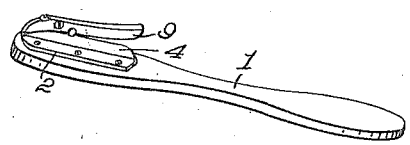
Fig. 4.  Fig. 5.
Inventor,
John H. Dearholt, by
G. C. Kennedy
Attorney.

Patented Feb. 20, 1923.

1,445,667

UNITED STATES PATENT OFFICE.

JOHN H. DEARHOLT, OF CEDAR FALLS, IOWA, ASSIGNOR OF ONE-THIRD TO WALTER O. WILLE, OF WATERLOO, IOWA.

TWINE CUTTER.

Application filed November 18, 1921. Serial No. 516,125.

*To all whom it may concern:*

Be it known that I, JOHN H. DEARHOLT, a citizen of the United States of America, and a resident of Cedar Falls, Blackhawk County, Iowa, have invented certain new and useful Improvements in Twine Cutters, of which the following is a specification.

My invention relates to improvements in twine cutters, and one object of my improvements is to provide suitably reinforced razor-edged cutting blades connected to be adjustably secured together in any set position.

Another object is to provide registering recesses in the cutting edges of the blades at or immediately to the rear of their angle of meeting to receive and quickly evacuate without clogging any fibers which may have passed between the blades thereinto.

These objects I have accomplished by the means which are hereinafter described and claimed, and which are illustrated in the accompanying drawings, in which Fig. 1 and Fig. 2 are elevations of opposite sides of said device, and Fig. 3 is a plan view thereof. Fig. 4 is an elevation of the receiving ends of said device. Fig. 5 is a reduced perspective of the device as mounted upon a handled portable back-plate.

Similar numerals of reference denote corresponding parts throughout the several views.

My improved cutter or shearing device is, because of its said construction, successfully operable to cut and sever not only twine, cord, or the like, but may be used to shear cloth or paper or the like, or when suitably mounted for portable manual use, to be employed in various other ways such as trimming hedges, small branches or other things.

The numeral 4 denotes a relatively stationary blade which may have a razor-edge as shown, or any other suitable cutting edge and has a longitudinal basal flange 2 which may be secured by means of screws 3 to any suitable fixed support 1, such as a door-jamb, or may be mounted on a handled back-plate 1 for manual use and portability, as shown in said Fig. 5.

The upper or rear part of the blade 4 has a raised portion 5 orificed to receive a pivot-bolt 13 passed through an orifice in a relatively adjustable cutting blade 9, the bolt being secured by a nut 14. Adjacent this projection, the non-cutting end of said blade is bent to one side angularly at 6 to provide an obliquely offset and sloping abutment or shoulder 6. The blade 9 has a relatively wide longitudinal flange 10 opposite its cutting edge, and the upper part of this flange is orificed to receive an adjusting bolt 11 passing through a nut 12, the end of the bolt engaging the sloping edge of said shoulder part 6, whereby the blade 9 may be adjusted relative to the blade 4 to any position in which it may be set with the edges of said blades converging to a meeting angle at or near registering recesses or notches 7 and 8 in said plates adjacent the projection 5.

The flange 10 on the blade 9 and the flange 2 on the blade 4 greatly stiffen and strengthen the blades to resist sidewise strains caused by the pull of an object being sheared between them at times. This reinforcement is also necessary when the blades both have a razor edge rather than a beveled edge as is obvious.

While the razor edges are normally keen enough to at once sever cleanly all the strands and fibers of twine, cord or small rope, yet, in case some fibers are drawn tightly into the meeting angle of the blades, these fibers will also enter or be pushed into the opening 7—8, which affords clearance and discharges them to prevent any clogging.

The device, when mounted portably, will be convenient for general use, and as the receiving ends of the blades are blunt and narrowly spaced apart, there is no danger of injury to the user.

Having described my invention, what I claim as new and desire to secure by Letters Patent, is:

1. A device of the character described, comprising a relatively stationary cutting-blade having a longitudinal flange, an adjustable cutting-blade having a longitudinal flange and pivoted adjacent one end to said stationary blade, said stationary blade having a shoulder, and an adjusting-bolt mounted eccentrically in the flange of said adjustable blade and terminally engaging said shoulder to adjust the adjustable blade to any set position.

2. A device of the character described, comprising a relatively stationary blade, a relatively adjustable blade, both having cooperating razor edges, and both having at or near the meeting angle of said edges registering notches forming an opening to receive and evacuate fibers passing between the blades thereinto, adjustable spacing-means for the adjustable blade, and pivotal locking-means connecting said blades to hold them in any relative adjustment.

3. A device of the character described, comprising shearing cutting blades pivotally connected, means for adjusting one of the blades toward and from the other to any set stationary position, said blades having longitudinal marginal flanges, and having registering recesses at or near the angle of meeting of their cutting edges, and a handled body on which one of said blades is mounted.

Signed at Waterloo, Iowa, this 21st day of Oct., 1921.

JOHN H. DEARHOLT.